United States Patent
Steiner et al.

(10) Patent No.: US 9,290,217 B2
(45) Date of Patent: Mar. 22, 2016

(54) VARIABLE HARDENING DEPTH IN TRACK LINK FOR A GROUND-ENGAGING TRACK

(71) Applicant: Caterpillar, Inc., Peoria, IL (US)

(72) Inventors: Kevin Lee Steiner, Tremont, IL (US); Timothy Arthur Thorson, Morton, IL (US); Mark Steven Diekevers, Germantown Hills, IL (US); Caroline Marie Brewer, Peoria, IL (US); Gregory J. Kaufmann, Metamora, IL (US); Temitope Olayemi Akinlua, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 267 days.

(21) Appl. No.: 13/933,491

(22) Filed: Jul. 2, 2013

(65) Prior Publication Data

US 2015/0008730 A1  Jan. 8, 2015

(51) Int. Cl.
*B62D 55/21* (2006.01)
*B62D 55/20* (2006.01)

(52) U.S. Cl.
CPC .............. *B62D 55/21* (2013.01); *B62D 55/202* (2013.01)

(58) Field of Classification Search
CPC ........ B62D 55/18; B62D 55/20; B62D 55/21; B62D 55/202; B62D 55/205
See application file for complete search history.

(56) References Cited

U.S. PATENT DOCUMENTS

| | | | |
|---|---|---|---|
| 3,955,855 A | | 5/1976 | Massieon et al. |
| 5,500,058 A | * | 3/1996 | Hirakawa et al. ............. 148/649 |
| 5,759,309 A | * | 6/1998 | Watts et al. ................... 148/637 |
| 7,040,080 B2 | * | 5/2006 | Okawa et al. .................. 59/35.1 |
| 7,338,138 B2 | | 3/2008 | Sho et al. |
| 2003/0230069 A1 | | 12/2003 | Okawa et al. |
| 2005/0040708 A1 | | 2/2005 | Yamamoto et al. |
| 2006/0043791 A1 | | 3/2006 | Sho et al. |
| 2006/0181151 A1 | | 8/2006 | Wodrich et al. |
| 2012/0286567 A1 | * | 11/2012 | Liu ............................... 305/185 |
| 2014/0083782 A1 | * | 3/2014 | Brewer et al. .................. 180/9.1 |

FOREIGN PATENT DOCUMENTS

JP   09-078134   3/1997

OTHER PUBLICATIONS

Brewer et al., Ground-Engaging Track System, Link for a Track Chain, and Method, U.S. Appl. No. 13/627,063, filed Sep. 26, 2012, 20 pages, United States Patent and Trademark Office, United States.

* cited by examiner

*Primary Examiner* — Kip T Kotter
(74) *Attorney, Agent, or Firm* — Baker & Hostetler LLP

(57) ABSTRACT

A track link for a ground-engaging track includes an elongate link body having a lower hardness material forming a lower mounting surface for mounting a track shoe, and a sacrificial higher hardness material forming an upper rail surface for contacting rotatable track engaging elements. The lower hardness and higher hardness materials transition at a material interface within the elongate link body, and the material interface is longitudinally non-uniform, such that the sacrificial higher hardness material has a varying depth from the upper rail surface to retard scalloping.

20 Claims, 4 Drawing Sheets

VARIABLE HARDENING DEPTH IN TRACK LINK FOR A GROUND-ENGAGING TRACK

TECHNICAL FIELD

The present disclosure relates generally to ground-engaging tracks for machines, and more particularly to varying a depth of a sacrificial higher hardness material in a track link from an upper rail surface.

BACKGROUND

A wide variety of machines utilize tracks as ground-engaging propulsion elements. It is common for such tracks to include a plurality of rotatable track engaging elements, with the track forming an endless loop moved about the rotating elements during operation. Such tracks typically include two chains of coupled together links, with bolted-on track shoes. The demands placed upon such machines and their associated track assemblies can be quite substantial, and the operating environments harsh. Machine tracks are often robust to provide a long operating life of thousands of hours despite significant mechanical stresses, strain and wear experienced during operation.

The wear phenomena experienced by machine track are typically a result of how the machine is used, the experience of the operator, and both the underfoot conditions and substrate materials in the operating environment. Field service life of machine track can vary based upon these factors from a few thousand hours to many thousands of hours. Since machine track components can be relatively costly, and servicing adds expense and machine down-time, engineers have long sought strategies for reducing and managing wear between and among the components.

One example of such a strategy is taught in U.S. Pat. No. 3,955,855 to Massieon et al. Massieon et al. disclose a track-type machine having track links with contact surfaces of high wear-resistant material engaging track rollers. The high wear-resistant material may be a composite alloy metallurgically bonded into a groove in the contact surface. While Massieon et al. appear to have developed a successful strategy, there is always room for improvement, and in particular with regard to the economics of material selection and manufacturability.

SUMMARY

In one aspect, a ground-engaging track for a machine includes a track chain assembly having a first track chain and a second track chain extending in parallel with the first track chain. The first and second track chains each including a plurality of elongate track links having a lower mounting surface for mounting a track shoe, and an upper rail surface configured to contact a rotating track-engaging element in the machine. Each of the elongate links further includes a lower hardness material forming the lower mounting surface, and a sacrificial higher hardness material forming the upper rail surface and transitioning with the lower hardness material at a material interface within the elongate link. The material interface is longitudinally non-uniform, such that the sacrificial higher hardness material has a varying depth from the upper rail surface retarding penetration of a wear scallop resulting from the contact into the lower hardness material.

In another aspect, a track link for a ground-engaging track in a machine includes an elongate link body having an inboard side and an outboard side each extending between first and second link body ends each having formed therein a track pin bore communicating between the inboard and outboard sides and configured to receive a track pin for coupling the elongate link body with adjacent elongate link bodies in a track chain. The elongate link body further includes a lower mounting surface for mounting a track shoe, and an upper rail surface configured to contact a rotating track engaging element in the machine. The elongate link body further includes a lower hardness material forming the lower mounting surface, and a sacrificial higher hardness material forming the upper rail surface and transitioning with the lower hardness material at a material interface within the elongate link body. The material interface extends through the elongate link body and is longitudinally non-uniform, such that the sacrificial higher hardness material has a varying depth from the upper rail surface retarding penetration of a wear scallop resulting from the contact into the lower hardness material.

In still another aspect, a track system for a machine includes a rotatable track engaging element, and a track extending about the rotatable track engaging element. The track includes a track chain formed by a plurality of coupled together links each having a lower surface, and an upper rail surface contacting the rotatable track engaging element. Each of the plurality of links further includes a lower hardness material forming the lower surface, and a sacrificial higher hardness material forming the upper rail surface. The sacrificial higher hardness material and the lower hardness material transition within the corresponding link at a longitudinally non-uniform material interface defining a varying depth of the sacrificial higher hardness material from the upper rail surface.

DETAILED DESCRIPTION

Figure 1:
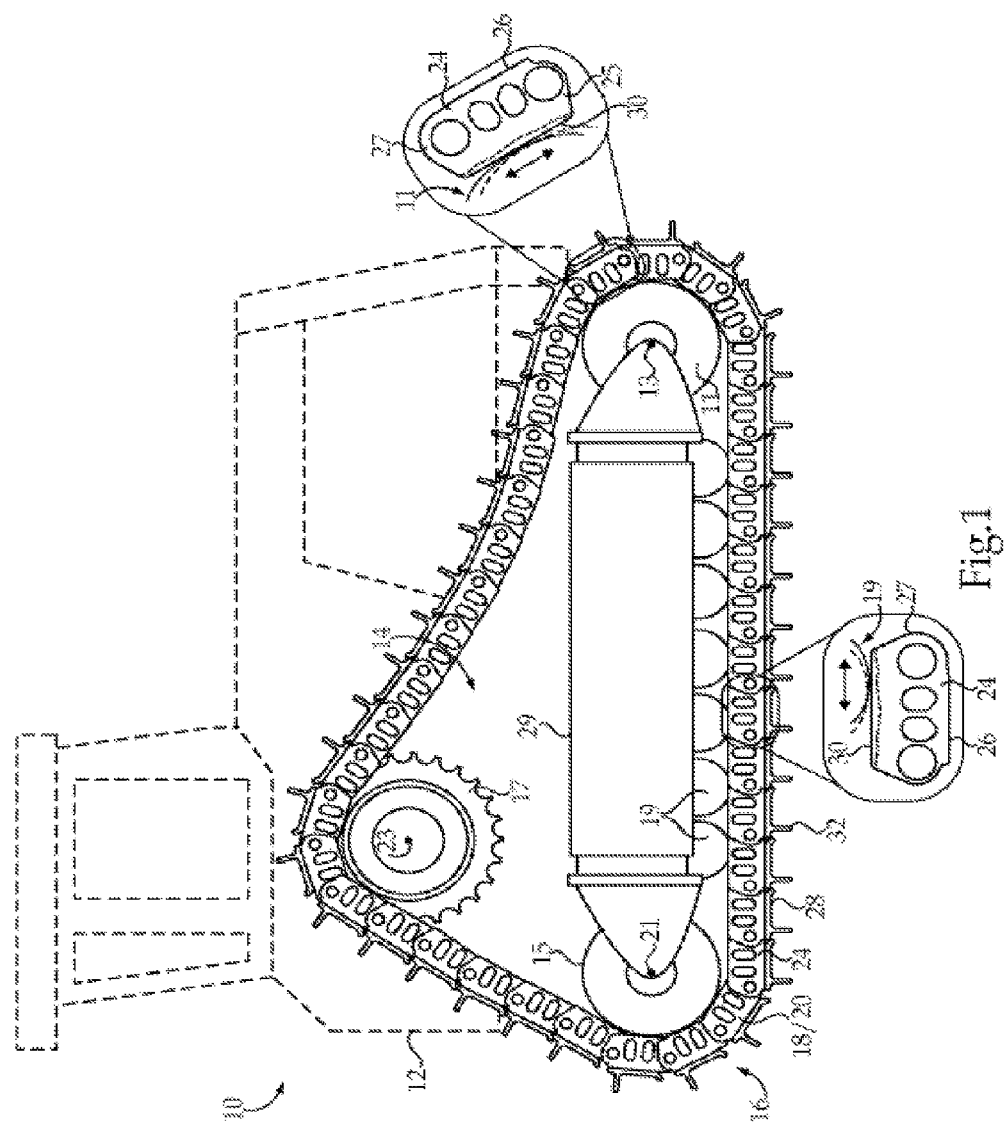
FIG. 1 is a side diagrammatic view of a machine having a track system according to one embodiment, and including detailed enlargements.

Referring to FIG. 1, there is shown a machine 10 including a ground-engaging track system 14 according to one embodiment. Machine 10 is shown in the context of a track-type tractor, but could be any of a variety of other machines such as a tracked loader, a half-track machine, or still others. Track system 14 may be one of two separate track systems positioned at opposite sides of a frame 12 of machine 10 in a conventional manner. Track system 14 may further include a track roller frame 29 coupled with machine frame 12, and a plurality of rotatable track-engaging elements 11, 15 and 17. In one embodiment, rotatable track-engaging elements 11 and 15 include rotatable idlers configured to rotate passively during operation of track system 14, whereas element 17 includes a sprocket configured to drive track system 14. Track system 14 may further include a plurality of track rollers 19 configured to bear all or substantially all of a weight of machine 10, also mounted to track roller frame 29. Track system 14 further includes a track 16 extending about each of elements 11, 15 and 17. Elements 11, 15 and 17 each define an axis of rotation 13, 21 and 23, respectively, which axes may be parallel and arranged in a triangular pattern as shown. Track 16 may thus define a travel path about elements 11, 15 and 17 having a generally triangular shape. The embodiment shown in FIG. 1 will be recognized by those skilled in the art as a so-called high drive track system, however, it should be appreciated that the present disclosure could be applied to oval tracks or some other track configuration. As will be further apparent from the following description, track system 14 may be uniquely configured to address certain wear issues associated with known track systems, and thereby increase track service life and ride quality over what is conventionally attainable.

Track 16 may include a track chain assembly 18 having a first track chain 20 and a second track chain extending in parallel with track chain 20 and hidden from view by track chain 20 in FIG. 1. A plurality of track shoes 28 are coupled with first track chain 20 and the second, hidden track chain. Each of track shoes 28 may include one or more grousers 32 in a conventional manner. Each of the first and second track chains may further include a plurality of elongate track links 24. Track links 24 may be understood to each include an elongate link body also identified with reference numeral 24. Description herein of features associated with one of track links 24 will thus be understood to also refer to features of the associated elongate link body. Each of track links 24 includes a first end 25 and a second end 27, and has a lower mounting surface 26 for mounting one of track shoes 28. Each of track links 24 further includes an upper rail surface 30 configured to contact a rotating track-engaging element in machine 10 such as one of elements 11, 15, 17, or track rollers 19, according to a scallop forming wear pattern.

FIG. 1 includes two detailed enlargements, one of which shows a track link 24 in contact with idler 11. Idler 11 is shown in solid line at a first position in contact with upper rail surface 30 of the associated link 24. In phantom, idler 11 is shown shifted generally along a length of rail surface 30. Contact between rail surface 30 and idler 11, and in particular the sliding contact that tends to occur during engaging and disengaging each individual link from idler 11 as well as idler 15, has been observed to wear away material of the track link in a pattern referred to as scalloping. In the case of idlers 11 and 15, a wear scallop can tend to form from repeated contacts between the track links and the outer surfaces of idlers 11 and 15 as track 16 moves about its path, forward and back as the case may be. The scallop formed from contact with the idlers tends to be more or less centrally located along rail surface 30, approximately halfway between first and second ends 25 and 27. Sprocket 17 will typically engage track 16 in a manner different from that of idlers 11 and 15, and is not a significant contributor to scalloping in many track systems, but in others could be.

Another detailed enlargement in FIG. 1 depicts an interfacing track roller 19 and one of links 24. Contact between track rollers 19 and links 24 may also occur according to a scallop forming wear pattern, but slightly differently than that associated with idlers 11 and 15. Those skilled in the art will appreciate that track 16 may traverse a generally straight path along a ground surface between idlers 11 and 15, but will have some capability of flexing via relative rotation between adjacent track links 24. For this and other reasons, track links 24 can slide as they engage and disengage with track rollers 19, causing wear that also imparts a tendency toward scallop formation. Wear scallops formed in response to the contact between track rollers 19 and links 24 will tend to be located away from the center of rail surface 30, and closer to first and second link ends 25 and 27. Scallop formation occurring in response to contact between track rollers 19 and links 24 tends to be less severe than that associated with contact with the idlers, and thus scallop formation may proceed relatively more slowly near the ends of links 24 versus the center, although different track designs could certainly experience different wear phenomenon.

Figure 2:
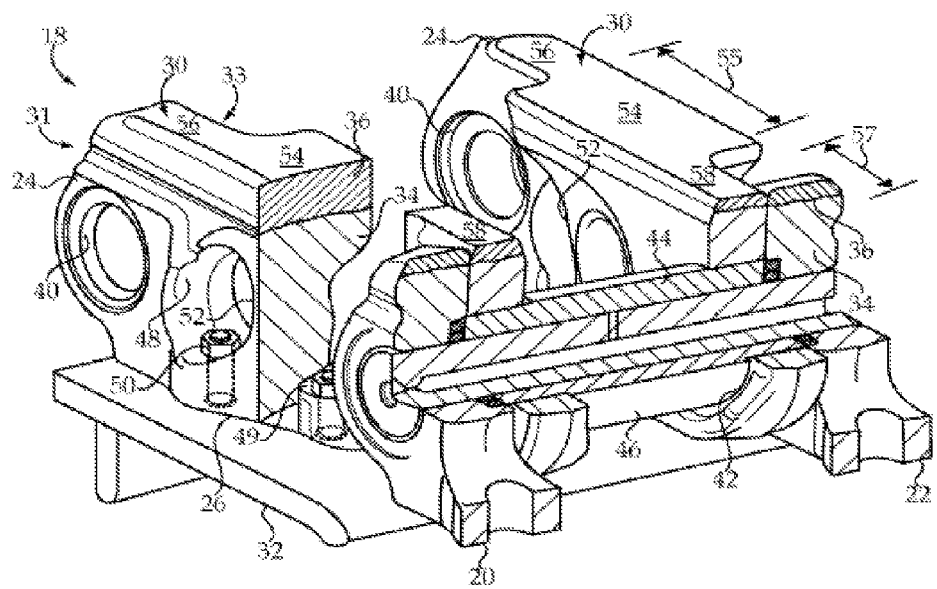
FIG. 2 is a sectioned diagrammatic view of a track, in multiple section planes, according to one embodiment.
Figure 3:
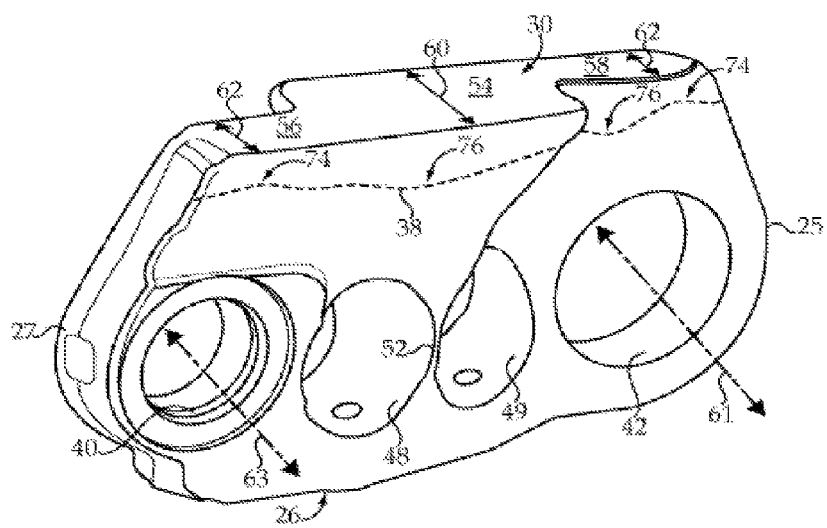
FIG. 3 is a diagrammatic view of a track link according to one embodiment.

Referring also now to FIGS. 2 and 3, first track chain 20 may be coupled with the second track chain 22 via a plurality of track pins 44, one of which is shown in FIG. 2. Upper rail surfaces 30 together form parallel rails in track chain assembly 18. A plurality of bushings 46, which may be rotatable or fixed, may be positioned upon each of the plurality of track pins 44. Each of links 24 may further define a first track pin bore 40 and a second track pin bore 42 each communicating between an inboard side 33 and an outboard side 31 of the corresponding link. Track pin bores 40 and 42 may be of different size and/or configuration, such as in the illustrated embodiment where one of track pin bores 40 and 42 receives one of track pins 44 while the other of track pin bores 40 and 42 receives both one of track pins 44 and an end of one of bushings 46. Each of track links 24 may further define a first nut seat window 48 and an adjacent second nut seat window 49 each located longitudinally between first and second track pin bores 40 and 42. Each of links 24 further includes a vertical strut 52 located between windows 48 and 49. Other link designs contemplated herein may not have a strut, windows, or certain other features.

It will be recalled that lower mounting surface 26 is configured for mounting one of track shoes 32. In a typical strategy, lower surface 26 may be substantially planar, and a plurality of bolts extend up through bores in track link 24 and are coupled with nuts 50 positioned one within each of nut seat windows 48 and 49. It may also be noted from FIG. 2 that links 24 in track chain 20 are mirror images of links 24 in track chain 22. Each of links 24 may further be understood as "offset" within a meaning of that term that will be familiar to those skilled in the art. The offset shape of links 24 may be such that upper rail surface 30 has a center section 54 extending longitudinally between a first end section 56 and a second end section 58 laterally offset from first end section 56. Upper rail surface 30 may be substantially planar prior to being placed in service, however, the present disclosure is not thereby limited.

Moreover, while offset links are one practical implementation strategy, in other embodiments straight links might be used. It may also be noted that center section 54 has a relatively greater width 60, in a lateral direction extending generally from inboard side 33 to outboard side 31. Each of end sections 56 and 58 may have a relatively narrower width 62 in the same lateral direction. The longitudinally varying width of rail surface 30, together with the different nature of idler-induced scalloping versus roller-induced scalloping, is addressed and exploited in the present disclosure via a unique hardening strategy for track links 24, as further discussed herein. In FIG. 2, reference numeral 55 identifies generally the length of an approximate zone of idler contact upon rail surface 30 within which idler-induced scalloping could be expected to occur, whereas reference numeral 57 identifies the length of an approximate zone where roller-induced scalloping can be expected to occur, and extending across two adjacent track links.

Each of links 24 may further include a lower hardness material 34 forming lower surface 26, and a sacrificial higher hardness material 36 forming upper rail surface 30. Higher hardness material 36 and lower hardness material 34 may each be steel, and link 24 may be formed as a one-piece forging from that steel. Lower hardness material 34 and higher hardness material 36 transition with one another at a material interface 38 within link 24. Material interface 38 may extend laterally and longitudinally through, meaning all the way through, link 24, and may be located between upper rail surface 30 and bores 40 and 42. It may be noted from the section plane through surface 54 in the left link 24 in FIG. 2 that higher hardness material 36 has a relatively greater depth at a location longitudinally coincident with center section 54 of surface 30. It may further be noted that higher hardness material 36 has a lesser depth at locations longitudinally coincident with end sections 58 and 56, the significance of which will be apparent from the following description. Material interface 38 is thus longitudinally non-uniform, such that higher hardness material 36 has a varying depth from upper rail surface 30. The varying depth retards penetration of a scallop, and in a practical implementation strategy may retard penetration of multiple scallops into lower hardness material 34 during service. In one practical implementation strategy, the varying depth of higher hardness material 36 defines a curving longitudinal contour having a plurality of peaks 74 and a plurality of valleys 76, which may each be finite in number, as shown in FIG. 3. The contour might form three or four peaks and three or four valleys in one embodiment. It may also be noted from FIG. 3 that the curving longitudinal contour forms a valley having a deepest point, in other words greatest depth, at a location longitudinally coincident with and adjacent vertical strut 52. The valley longitudinally coincident with vertical strut 52 may include a deepest one of the plurality of valleys, from upper rail surface 30. It may further be noted from FIG. 3 that the curving longitudinal contour forms a peak longitudinally aligned with track pin bore 42, and a second peak longitudinally aligned with second track pin bore 40. As used herein, the term "aligned" may be understood more narrowly than the term coincident. Accordingly, the peak 74 aligned with bore 42 may be located directly vertically above a center axis 61 of bore 42, and the peak 74 aligned with bore 40 may be located directly vertically above a center axis 63 of bore 40. A deepest point of the center valley 76 longitudinally coincident with center strut 52 might also be aligned with strut 52, thus positioned directly vertically above a longitudinal centerpoint of strut 52. In a practical implementation strategy, higher hardness material 36 may have a Rockwell C hardness of about 45 or greater. Lower hardness material 34 may have a Rockwell C hardness less than the hardness of material 36. In a further aspect, the depth of material 36 may be defined by an extent of material hardness in link 24 that is about 45 Rockwell C or greater.

It should be appreciated that the particular contour defined by material interface 38 will likely vary depending upon the track system for which the subject track link is designed. Different track systems can exhibit different wear patterns based upon their basic construction, and also upon such factors as service environment and the manner in which an operator drives the machine. It is nevertheless contemplated that many track links within the context of the present disclosure will have a material interface with a longitudinally curving contour, designed such that peaks and valleys are located in response to expected wear locations and severity, and overall link design. In the case of a straight link where the upper rail surface does not have a varying width, the ample material on ends of the link for resisting wear might allow the use of very little or no higher hardness material toward the link ends at all. Hardening depth, and thus peak and valley location, may also be controlled based upon end purposes of different link features. For instance, hardening of material forming bores 40 and 42 may be avoided to prevent interfering with, or cracking from, track pin or bushing press fits.

Figure 4:
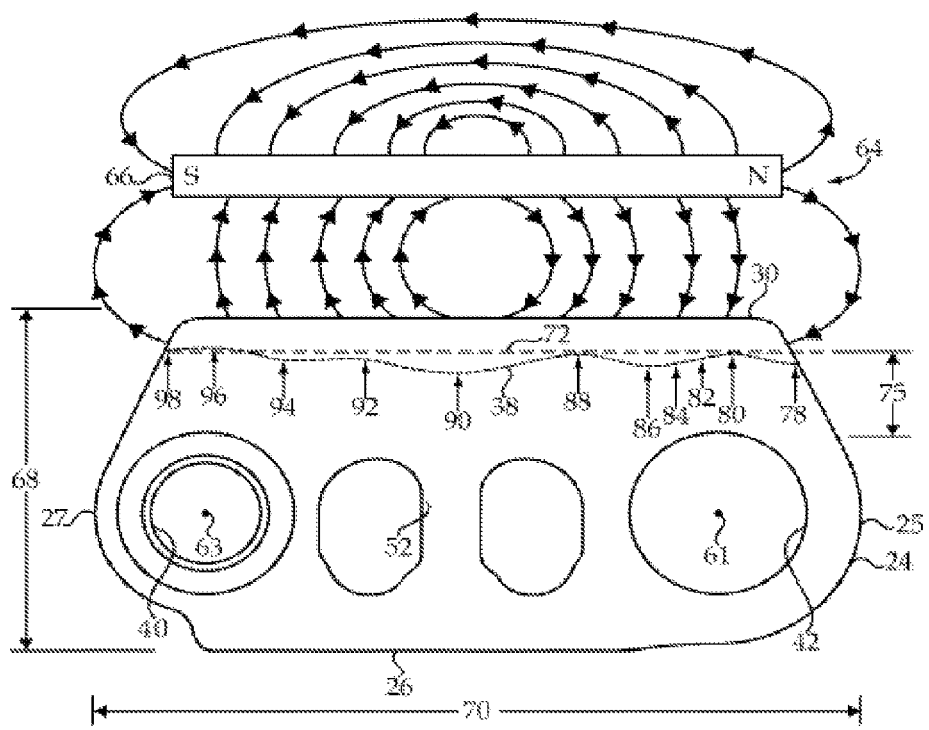
FIG. 4 is a side diagrammatic view of a track link shown at a processing stage, according to one embodiment.

Referring now to FIG. 4, there is shown track link 24 as it might appear in proximity to an induction hardening apparatus 64, shown schematically and configured to harden track link 24 in the manner generally contemplated herein. Apparatus 64 includes a coil 66 configured to generate a magnetic field that heats track link 24 according to well-known principles. Conventional induction hardening strategies for track links typically sought to harden the track link to a uniform hardening depth from a rail surface. Known rail insert strategies such as Massieon et al., discussed above, use uniform depth inserts. In light of the present description, it will be understood that apparatus 64 will be used to harden material of link 24 to a varying depth, in contrast to these known techniques. To this end, coil 66 may be configured via known strategies to drive more energy into certain areas of track link 24 and less energy into other areas. Apparatus 64 may be used in a so-called single shot strategy, where all of the hardening of link 24 is done at once. Alternatively, scanning induction hardening might be used where an induction coil is moved along a surface, and could have a residence time or relative travel speed at different regions depending upon the desired depth of hardening to be obtained at those different regions.

FIG. 4 also depicts various additional geometric attributes of material interface 38, and track link 24 itself. Track link 24 may include a vertical height 68 extending between surface 26 and surface 30, and a length 70 extending between first end 25 and second end 27. Height 68 may be from about 150 mm to about 200 mm in certain embodiments, whereas length 70 may be from about two to about three times length 68. The present disclosure can be expected to scale up or down from these general dimensions, however. Also depicted in FIG. 4 is a plane 72 that represents an approximate 120% wear condition of track link 24. An analogous 120% wear condition, if met, in a known link design would typically represent a wear state where the link would be removed from service, if not before. Plane 72 is located at a vertical distance 75 from bore 42, and generally represents a reference point set deeper than the uniform depth of hardening that would have been used in prior designs, which was commonly a Rockwell C hardness to about 15 mm or greater. Distance 75 might be about 20 mm, but could vary depending upon intended track service life, for example. It may also be noted that the curving longitudinal contour of material interface 38 curves away from and toward plane 72, and intersects plane 72 at certain points.

Figure 5:
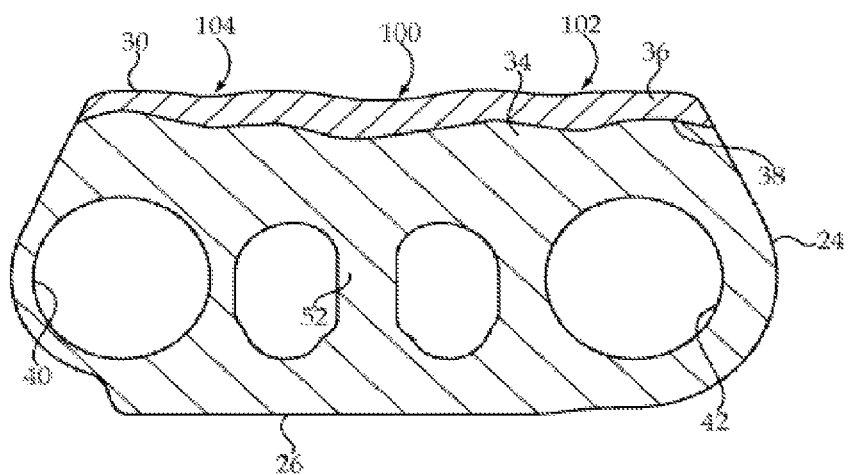
FIG. 5 is a sectioned side diagrammatic view of a track link in an earlier state of wear, according to one embodiment.

In FIG. 4, a plurality of different depth locations 78-98 are shown, each representing a depth of higher hardness material, and thus a general location of material interface 38, relative to plane 72. At a first depth location 78, the depth of higher hardness material may be about 4 mm, at a second depth location 80 the depth of higher hardness material may only extend from rail surface 30 to plane 72. At another depth location 82, the depth of higher hardness material may be about 3 mm from plane 72, and 5 mm, 6 mm and 4 mm at depth locations 82, 84, 86 and 88, respectively. At a depth location 90, corresponding to the deepest valley formed by material interface 38, the depth may be about 8 mm from plane 72. At depth locations 92, 94, 96 and 98, the depths of higher hardness material from plane 72 may be about 4 mm, 5 mm, 3 mm, 0 mm, and 4 mm, respectively. The various depth locations in FIG. 5 are examples that might be observed approximately half way between inboard and outboard sides 33 and 31. The depth of material 36 could vary modestly in a lateral direction, especially in the thickest part of link 24, as shown in FIG. 2. As used herein, the term "about" should be understood in the context of conventional rounding to a consistent number of significant digits. Accordingly, "about 4 mm" means from 3.5 mm to 4.4 mm. "About 45" means from 44.5 to 45.4, and so on.

INDUSTRIAL APPLICABILITY

Referring to FIG. 5, there is shown track link 24 as it might appear after having been subjected to moderate wear in track system 16, part way through a service life in machine 10. It may be noted that upper rail surface 30 is no longer planar, and a plurality of scallops, including a center scallop 100, an end scallop 102, and another end scallop 104 have begun to form therein. It will be noted that upper rail surface 30 still is formed by higher hardness material 36.

Figure 6:
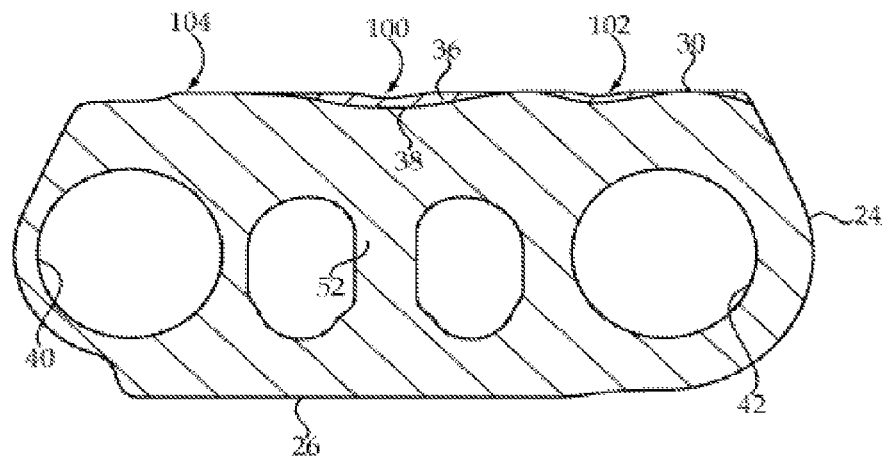
FIG. 6 is a sectioned side diagrammatic view of a track link in a later state of wear.

Referring now to FIG. 6, there is shown track link 24 as it might appear further into its service life, and where upper rail surface 30 is no longer formed exclusively of higher hardness material 36. At the state depicted in FIG. 6, scallops 100, 102 and 104 are less prominent, and in the case of scallop 104 may be not even detectable, such that upper rail surface 30 has worn back towards a relatively planar state.

Figure 7:
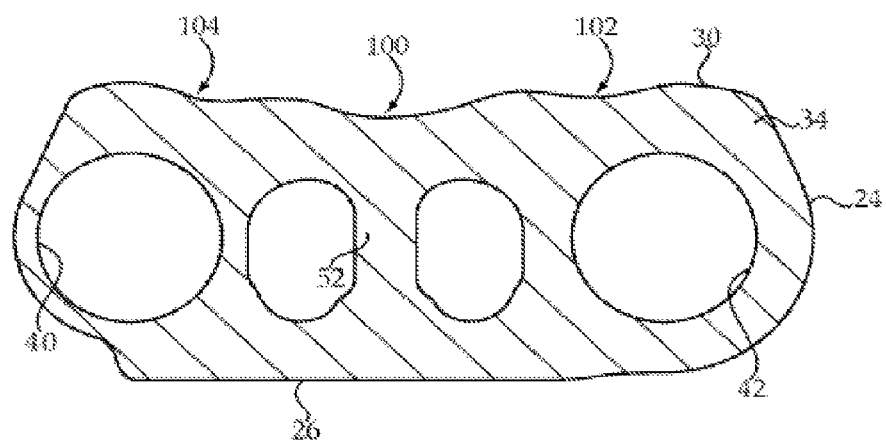
FIG. 7 is a sectioned side diagrammatic view of a track link in a still later state of wear.

Referring now to FIG. 7, there is shown track link 24 as it might appear at or near an end of its service life. In FIG. 7, all of higher hardness material 36 has been worn away, and upper rail surface 30 is formed entirely of lower hardness material 34. Scallops 100, 102 and 104 have enlarged relative to the state shown in FIG. 6, and center scallop 100 is noticeably deeper than either of scallops 102 and 104. At the state depicted in FIG. 7, an operator would likely experience a relatively rough ride from the bumping of the rotatable track engaging elements against upper rail surface 30, and track 16 might be considered ready for replacement and/or servicing.

In certain earlier designs where track link wear progressed via a scallop past the full depth of hardening in one area, additional higher hardness material beginning at longitudinal ends of the scallop would tend to be worn away as the scallop penetrated into the underlying lower hardness material. Such scalloping wear typically was most severe at or close to a longitudinal center of the rail surface, at least initially. This phenomena tended to hasten subsequent wearing away of higher hardness material across the entire rail surface, unduly shortening track service life. The present disclosure can be understood to tune the depth of hardening so that scallop penetration into lower hardness material is retarded. Rather than a uniform depth of higher hardness material which one or more scallops can break through, additional depth of higher hardness material is selectively located to make its wearing away more uniform and thus prolong track service life.

One further aspect of the strategy set forth herein is an improved ride for the operator throughout a service life of track system 16. Depending on various factors, the ride when track link 24 is worn to the state shown in FIG. 5 would likely be rougher than that experienced when track link 24, and of course the other track links in track system 16, are first placed in service and the upper rail surface is relatively flat. The ride conditions may nevertheless tend to improve as wear progresses to the state shown in FIG. 6 where upper rail surface 30 is relatively planar once more. In earlier strategies where hardening depth was uniform, wearing away of higher hardness material would tend to occur in a pattern similar to that shown in FIG. 5. Due to the unevenness of the wear phenomena, and commonly concentration of wear in the center of the track links, however, as noted above it was common for a center scallop to break through the higher hardness material and begin wearing away lower hardness material. At this point during the track service life, it mattered relatively little that some higher hardness material remained towards the ends of the links, as a center scallop could wear its way outwardly as well as downwardly into the link. Once the operator's ride quality began to deteriorate, it typically only worsened over time.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A ground-engaging track for a machine comprising:
a track chain assembly including a first track chain and a second track chain extending in parallel with the first track chain, the first and second track chains each including a plurality of elongate track links having a lower mounting surface for mounting a track shoe, and an upper rail surface configured to contact a rotating track-engaging element in the machine;
each elongate link of the plurality of elongate track links further including a lower hardness material forming the lower mounting surface, and a sacrificial higher hardness material forming the upper rail surface, the lower mounting surface facing away from the upper rail surface in a height direction, a hardness of the sacrificial higher hardness material being greater than a hardness of the lower hardness material,
the sacrificial higher hardness material transitioning to the lower hardness material at a material interface within the elongate link,
the sacrificial higher hardness material having a first thickness and a second thickness each of which extending in the height direction from the upper rail surface to the material interface, the first thickness being different from the second thickness, the first thickness having a first hardness extending therethrough, the second thickness having a second hardness extending therethrough, wherein the first hardness is substantially equal to the second hardness.

2. The track of claim 1, wherein each elongate link of the plurality of elongate track links defines a first track pin bore and a second track pin bore spaced from the first track pin bore in a longitudinal direction, each of the first and second track pin bores extending through the elongate link in a lateral direction, wherein the lateral direction, the longitudinal direction, and the height direction are angularly offset from one another, the material interface extending in the longitudinal and the lateral directions through the elongate link between the upper rail surface and the first and second track pin bores, the track further comprising a plurality of track pins, each track pin of the plurality of track pins being received within one of the track pin bores and coupling together the first and second track chains.

3. The track of claim 2, wherein the lower hardness material has a varying depth extending from the lower mounting surface to the material interface, the varying depth of the lower hardness material defining a curving longitudinal contour having a plurality of peaks and a plurality of valleys.

4. The track of claim 3, wherein each elongate link of the plurality of elongate track links further defines a first and a second window each located longitudinally between the first and the second track pin bores in the longitudinal direction, each elongate link including a vertical strut located between the first and the second windows in the longitudinal direction, and wherein the curving longitudinal contour forms a center valley coincident with the vertical strut in the longitudinal direction.

5. The track of claim 4, wherein the center valley includes a deepest valley of the plurality of valleys, from the upper rail surface.

6. The track of claim 3, wherein the curving longitudinal contour forms a first peak aligned with the first track pin bore in the longitudinal direction, and a second peak aligned with the second track pin bore in the longitudinal direction.

7. The track of claim 2, wherein the plurality of elongate track links in the first track chain are mirror images of the plurality of elongate track links in the second track chain, and the track further comprises
 a plurality of track pins coupling together the first and second track chains, each track pin of the plurality of track pins being received within one of the track pin bores, and
 a plurality of bushings positioned upon the plurality of track pins.

8. The track of claim 7, wherein the upper rail surface has a center section extending between a first end section and a second end section, the second end section being offset from the first end section in the lateral direction, wherein the upper rail surface has a first upper rail surface width corresponding to the first end section, a second upper rail surface width corresponding to the second end section, and a third upper rail surface width corresponding to the center section, the third upper rail surface width being greater than each of the first upper rail surface width and the second upper rail surface width.

9. The track of claim 8, wherein the center section of the upper rail surface having the first thickness of the sacrificial higher hardness material, and the first end section and the second end section of the upper rail surface having the second thickness of the sacrificial higher hardness material, the first thickness being greater than the second thickness.

10. A track link for a ground-engaging track in a machine comprising:
 an elongate link body including an inboard side and an outboard side each extending between first and second link body ends each having formed therein a track pin bore communicating between the inboard and outboard sides and configured to receive a track pin for coupling the elongate link body with adjacent elongate link bodies in a track chain;
 the elongate link body further including a lower mounting surface for mounting a track shoe, and an upper rail surface configured to contact a rotating track-engaging element in the machine;
 the elongate link body further including a lower hardness material forming the lower mounting surface, and a sacrificial higher hardness material forming the upper rail surface, the lower mounting surface facing away from the upper rail surface in a height direction, a hardness of the sacrificial higher hardness material being greater than a hardness of the lower hardness material, the sacrificial higher hardness material transitioning to the lower hardness material at a material interface within the elongate link body;
 the sacrificial higher hardness material having a first thickness and a second thickness each of which extending in the height direction from the upper rail surface to the material interface, the first thickness being different from the second thickness, the first thickness having a first hardness extending therethrough, the second thickness having a second hardness extending therethrough, wherein the first hardness is substantially equal to the second hardness.

11. The track link of claim 10, wherein the elongate link body defining a first adjacent window and a second adjacent window located between the first track pin bore and the second track pin bore, the elongate link body including a vertical strut located between the first adjacent window and the second adjacent window, and wherein the varying depth of the sacrificial higher hardness material is greatest at a location coincident with the vertical strut in the height direction.

12. The track link of claim 10, wherein the upper rail surface is substantially planar and includes a center section extending between a first end section and a second end section laterally offset from the first end section, wherein the upper rail surface has a first upper rail surface width corresponding to the first end section, a second upper rail surface width corresponding to the second end section, and a third upper rail surface width corresponding to the center section, the third upper rail surface width being greater than each of the first upper rail surface width and the second upper rail surface width.

13. The track link of claim 12, wherein the center section of the upper rail surface having the first thickness of the sacrificial higher hardness material, and the first end section and the second end section of the upper rail surface having the second thickness of the sacrificial higher hardness material, the first thickness being greater than the second thickness.

14. The track link of claim 10, wherein the varying depth of the sacrificial higher hardness material defines a curving longitudinal contour having a plurality of peaks and a plurality of valleys.

15. The track link of claim 14, wherein the plurality of peaks and the plurality of valleys are finite in number, and include a first and a second peak at locations coincident with the first and second track pin bores in the height direction, respectively, and a valley at a location between the first and second peaks in the height direction.

16. A track system for a machine comprising:
 a rotatable track engaging element;
 a track extending about the rotatable track engaging element, and having a track chain formed by a plurality links coupled together, each link of the plurality of links including a lower surface and an upper rail surface contacting the rotatable track engaging element; and
 each link of the plurality of links further including a lower hardness material forming the lower surface, and a sacrificial higher hardness material forming the upper rail surface, the lower mounting surface facing away from the upper rail surface in a height direction, a hardness of the sacrificial higher hardness material being greater than a hardness of the lower hardness material, the sacrificial higher hardness material transitioning to the lower hardness material at a material interface within each link,
 the sacrificial higher hardness material having a first thickness and a second thickness each of which extending in the height direction from the upper rail surface to the material interface, the first thickness being different from the second thickness, the first thickness having a first hardness extending therethrough, the second thickness having a second hardness extending therethrough, wherein the first hardness is substantially equal to the second hardness.

17. The track system of claim 16, wherein the track further includes a second track chain and a plurality of track pins coupling the first and second track chains together in a chain assembly having parallel rails formed by the upper rail surfaces, and the second track chain including a plurality of links each being a mirror image of the plurality of links forming the first track chain.

18. The track system of claim 17, wherein the upper rail surface in each link of the plurality of links in the first and second track chains has a center section extending between a first end section and a second end section in a longitudinal direction, the first section having a first width, the second section having a second width, and the center section having a third width, the third width being greater than each of the first width and the second width, and wherein the center section having a third thickness extending in the height direction and the first section and the second section each having a fourth thickness extending in the height direction, the third thickness being greater than the fourth thickness.

19. The track system of claim 18, wherein each link of the plurality of links defines a first track pin bore, a second track pin bore, a first window, and a second window adjacent to the first window, the first window and the second window being positioned between the first track pin bore and the second track pin bore in the longitudinal direction, and wherein each link of the plurality of links includes a vertical strut located between the first window and the second window and adjacent to a greatest thickness of the sacrificial higher hardness material.

20. The track system of claim 19, wherein the material interface extends through the link and is located between the upper rail surface and the first track pin bore and the second track pin bore therein in the height direction.

\* \* \* \* \*